United States Patent
Hua et al.

(10) Patent No.: US 7,743,129 B2
(45) Date of Patent: Jun. 22, 2010

(54) METHODS AND ARRANGEMENTS TO DETECT A FAILURE IN A COMMUNICATION NETWORK

(75) Inventors: Binh K. Hua, Austin, TX (US); Sivarama K. Kodukula, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 11/380,993

(22) Filed: May 1, 2006

(65) Prior Publication Data

US 2007/0255819 A1    Nov. 1, 2007

(51) Int. Cl.
G06F 15/173 (2006.01)

(52) U.S. Cl. .................... 709/223; 709/224

(58) Field of Classification Search ............. 709/223, 709/224, 239, 249; 370/216, 271, 221; 714/2, 714/6, 10, 25, 39, 47
See application file for complete search history.

(56) References Cited

U.S. PATENT DOCUMENTS

| | | | |
|---|---|---|---|
| 5,663,950 A | 9/1997 | Lee et al. | |
| 5,664,219 A | 9/1997 | Glassen et al. | |
| 5,774,640 A | 6/1998 | Kurio | |
| 6,049,528 A | 4/2000 | Hendel et al. | |
| 6,049,825 A * | 4/2000 | Yamamoto | 709/221 |
| 6,078,957 A * | 6/2000 | Adelman et al. | 709/224 |
| 6,108,200 A | 8/2000 | Coile et al. | |
| 6,314,525 B1 | 11/2001 | Mahalingham et al. | |
| 6,539,338 B1 | 3/2003 | Pickreign et al. | |
| 6,601,195 B1 | 7/2003 | Chirashnya et al. | |
| 6,661,792 B1 | 12/2003 | Park | |
| 6,735,679 B1 | 5/2004 | Herbst et al. | |
| 6,760,859 B1 | 7/2004 | Kim et al. | |
| 6,868,062 B1 * | 3/2005 | Yadav et al. | 370/234 |
| 7,275,175 B2 * | 9/2007 | Cardona et al. | 714/4 |
| 7,506,214 B2 * | 3/2009 | Anglin et al. | 714/43 |
| 2002/0018447 A1 | 2/2002 | Yamada et al. | |
| 2003/0158921 A1 | 8/2003 | Hare et al. | |
| 2004/0165525 A1 | 8/2004 | Burak | |
| 2005/0010837 A1 * | 1/2005 | Gallagher et al. | 714/100 |

(Continued)

OTHER PUBLICATIONS

ISR including PCT transmittal, & Written Opinion, From the International Searching Authority, mailed Nov. 9, 2007; Applicant: International Business Machines Corporation, International Application No. PCT/EP2007/054115, pp.-13.

(Continued)

*Primary Examiner*—Lashonda T Jacobs
(74) *Attorney, Agent, or Firm*—Diana R. Gerhardt; Schubert Osterrieder & Nickelson PLLC

(57) ABSTRACT

Methods and arrangements to monitor communication components such as a network adapters for activity, and identify components that have lower than normal levels of activity are provided. An identified communication component can become suspect component and a candidate for further testing, including different forms of interrogation. Process for interrogating candidates can include generating and sending test packets having the media access control (MAC) address of the candidate to the candidate and if activity is not detected subsequent to the interrogation, the candidate can be flagged as a failed component. Correspondingly, the component can be deactivated and removed from service. In a further embodiment, a backup component can be activated and assume the role previously held by the failed component.

29 Claims, 6 Drawing Sheets

U.S. PATENT DOCUMENTS

| | | | |
|---|---|---|---|
| 2005/0259632 A1* | 11/2005 | Malpani et al. | 370/351 |
| 2006/0020854 A1* | 1/2006 | Cardona et al. | 714/13 |
| 2006/0039276 A1 | 2/2006 | Jain et al. | |
| 2006/0218438 A1* | 9/2006 | Yamaguchi et al. | 714/9 |
| 2007/0025253 A1* | 2/2007 | Enstone et al. | 370/235 |
| 2008/0222661 A1* | 9/2008 | Belyakov et al. | 719/321 |
| 2008/0320135 A1* | 12/2008 | Challener et al. | 709/224 |

OTHER PUBLICATIONS

Weaver, Tom, "White Paper: HACMP and New Technologies for Availability" IBM White Paper (Online), Apr. 2004, pp. 1-9.

* cited by examiner

METHODS AND ARRANGEMENTS TO DETECT A FAILURE IN A COMMUNICATION NETWORK

FIELD

The present disclosure relates generally to communications networks. More particularly, the present disclosure relates to methods and arrangements for detecting failures of individual components in a bundle of communication components, such as bundled adapters.

BACKGROUND

The demand for speed and reliability in communications between communication devices such as servers, routers, switches and computers continues to increase. Applications or other programs that demand significant network resources, such as streaming on-line media continue to grow in popularity. Further, the number of users continues to increase and, as bandwidths increase, users invent new uses for the improved bandwidths. Thus, the demand for bandwidth in networks that are already operating near capacity appears to be ever increasing.

Ethernet-based communication networks have gained popularity in the marketplace and variations of the Ethernet technologies continue to provide improved bandwidths. More specifically, the Ethernet family has been expanded to include a Fast Ethernet system and a Gigabit Ethernet system. Both systems provide significant bandwidth improvements over prior Ethernet configurations. However, even these Ethernet systems cannot adequately meet the growing demand.

To address this shortcoming, many current communication networks have scalability features that allow additional communication paths to be added as the demand for bandwidth increases. In Ethernet based systems, adding network adapters such as network interface cards (NICs) facilitate these new communication paths. A network adapter typically includes an adapter card and a network driver, which is code to facilitate operation of the adapter card by, e.g., the operating system of a computer.

Generally, multiple adapter cards can be "bundled", e.g., plugged into a communication device and configured to transmit and receive data in parallel. An Etherchannel driver typically implements a load-sharing arrangement for the bundled adapters in Ethernet networks. Many standards have been developed, such as IEEE 802.3a & d to address bundled adapters for a cluster of communications devices. Bundled adapters are not assigned to a particular communication device, but transmissions from clustered communications devices can be assigned to one of the bundled adapters based upon the workload of that adapter in relation to the other of the bundled adapters. From a software application's perspective, the parallel operation of the bundled adapters effectively creates a single, higher bandwidth, communications channel. For instance, a bundle of eight network adapters can multiply data transmission speeds to eight times the speed of a single adapter.

Moreover, bundled adapters may be configured to handle data transmission for a single Internet protocol (IP) address or multiple IP addresses, depending upon the number of clustered communications devices being supported by the bundled adapters. Thus, communication devices such as switches, routers and servers can be clustered and configured to share bundled adapters or can utilize a dedicated, high bandwidth channel comprised of bundled adapters.

Bundled adapters that support a cluster of communication devices can be utilized to create a high availability cluster multiprocessing (HACMP) environment. A HACMP environment ensures that a communication path is available and communication devices are reachable nearly all of the time, making downtime a rare occurrence. A communication device in a HACMP system can also incorporate failure detection schemes to detect failed communication channels.

Historically, failure detection schemes for communication networks have utilized a "heartbeat" mechanism. The heartbeat mechanism is used to detect the operational state of a network adapter, at a software application level such as HACMP, by detecting the operational state of the communications channel, i.e., whether data can successfully transmit across the channel.

Such failure detection schemes recognize the inability to transmit data across the channel and can relate that failure to the network adapter when a single network adapter handles the transmission and receipt of communications across the channel. A problem with current failure detection schemes is that they do not allow detection of a subset of the network adapters in a bundle of adapters. For bundled adapters, software applications perceive the operation of the channel and not the operation of individual adapters. In particular, if one network adapter of a bundle fails, an Etherchannel driver will retransmit the data packets assigned to the failed adapter until successful transmission occurs via other adapters in the bundle. As a result, data communications across the channel are degraded but do not necessarily fail. The process of, retransmitting until a successful communication is achieved, greatly reduces the efficiency of a communication system.

SUMMARY OF THE INVENTION

The problems identified above are in large part addressed by methods and arrangements provided herein to detect a failure in communication network interfaces with bundled components such as network adapters and sub-components thereof. One embodiment comprises a method to detect a failure of a communication component of a bundle of components. The method may involve routing data to a communication component that shares at least one Internet protocol address with other communication components of the bundle, wherein routing the data should activate at least a portion of the communication component and monitoring at least the portion of the communication component to determine a monitored activity level responsive to the communication. The method further involves comparing the monitored activity level to a predetermined activity level and flagging the communication component as a failed component if the monitored activity level is less than a predetermined activity level.

Another embodiment comprises an apparatus configured to detect failures. The apparatus may comprise a traffic generator adapted to generate at least one packet to initiate a data transmission routed via a communication component of a bundle of components, wherein the bundle of components is configured to share data transmission activity related to at least one network address. The apparatus may further comprise an activity monitor to detect a monitored activity level of the communication component responsive to the at least one packet and an activity comparator to compare the monitored activity level against a predetermined activity level to determine whether to identify the communication component as a failed component.

A further embodiment includes an apparatus to detect failure of a network adapter of bundled adapters. The apparatus may comprise a timer to define a time interval, an activity monitor to determine an activity level of a network adapter during the time interval and to monitor activity of the network adapter responsive to at least one test packet, and an activity comparator to compare the determined activity level to a predetermined activity level, to identify the network adapter as a suspect adapter if the determined activity is less than the predetermined activity level. The apparatus may further comprise a traffic generator to transmit at least one test packet to the suspect adapter and a flagger to flag the suspect adapter as a failed adapter if the monitored activity is less than a projected activity associated with the at least one test packet.

Another embodiment includes a system. The system may comprise bundled adapters to share a data transmission load and a failure detection logic coupled to the bundled adapters to retrieve a first value indicative of data transmission activity and to identify a suspect adapter based upon the value. The failure detection logic may also transmit a test packet via the suspect adapter, retrieve a second value indicative of data transmission activity via the suspect adapter, and determine whether to mark the suspect adapter as a failed adapter based upon the second value.

Yet another embodiment includes a computer program product comprising a computer useable medium having a computer readable program. The computer readable program when executed on a computer causes the computer to route data to a communication component that shares at least one Internet protocol address with other communication components of the bundle, wherein routing the data should activate at least a portion of the communication component, and monitor at least the portion of the communication component to determine a monitored activity level responsive to the communication. The computer readable program when executed on a computer further causes the computer to compare the monitored activity level to a predetermined activity level and identify the communication component as a failed component if the monitored activity level is less than a predetermined activity level.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

Figure 1:
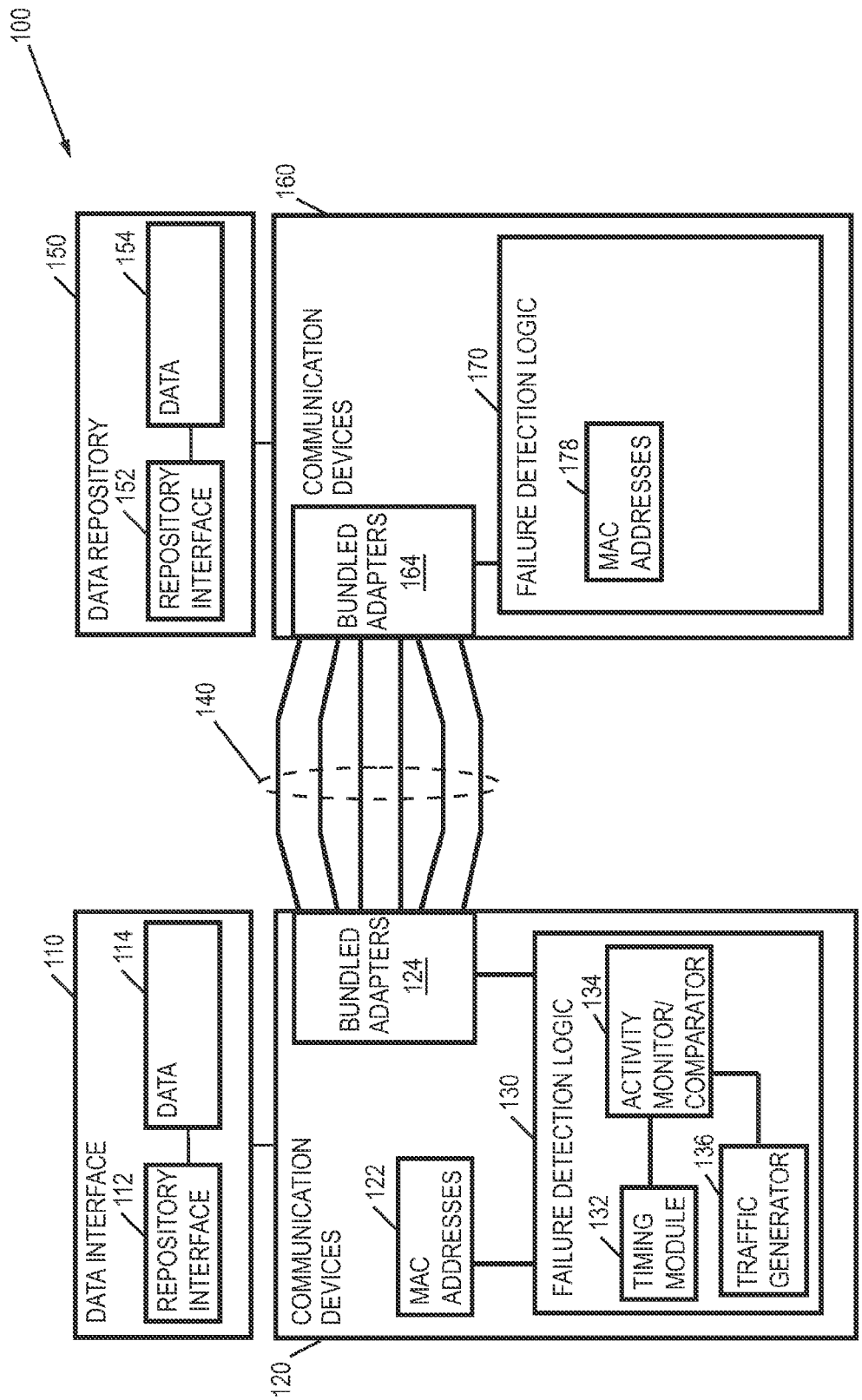
FIG. 1 depicts two communication devices that are interconnected via bundled adapters to transfer large amounts of data between a data repository and a data interface.

The following is a detailed description of novel embodiments depicted in the accompanying drawings. The embodiments are in such detail as to clearly communicate the subject matter. However, the amount of detail offered is not intended to limit anticipated variations of the described embodiments; but on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally, methods and arrangements to detect failures in communication networks having bundled components are provided herein. While specific embodiments will be described below with reference to adapters, components, circuits or logic configurations, those of skill in the art will realize that embodiments of the present disclosure may advantageously be implemented with other components and configurations. Many embodiments may effectively detect a failure of any component or subset of components that have been bundled in a communications network.

Embodiments described hereafter detect failure of individual components of a bundle of components such as bundled adapters. Components are often bundled, e.g., configured to work together and share workload, such that numerous components can transmit and receive data for a single computer, switch, router, hub, etc., or a group thereof. Generally, communication devices may interface a communications network via bundled adapters. One embodiment may send a test packet to an adapter of the bundle by incorporating media access control (MAC) address for the adapter. The embodiment may then monitor the adapter to determine whether the transmission creates activity within the adapter. If no activity is detected, the adapter may be flagged as a failed adapter.

Further embodiments may monitor adapters of an adapter bundle for successful transmission and/or receipt of data. In such embodiments, if activity of an adapter does not meet or exceed a predetermined level of activity, one or more test packets may be addressed to transmit to and/or from the adapter.

Monitoring activity of an adapter in a bundle of adapters may be accomplished via one or more mechanisms. For instance, a register in each adapter of the bundle may maintain a count or other indication of packets transmitted from and/or to the corresponding adapter. In some embodiments, the indication may comprise a count or other value indicative of successful transmission and/or receipt of data. In other embodiments, a circuit may monitor a signal applied to a communication medium by an adapter to determine transmission activity. In further embodiments, the adapter may monitor a content of an incoming or outgoing queue associated with an adapter to determine an activity level. And, in still further embodiments, self-test mechanisms within each adapter may be initiated to determine activity. Other monitoring implementations are also contemplated.

Once an adapter fails a test, the adapter can be flagged as a failed adapter and/or a backup adapter may activate to replace the failed adapter. The failed adapter may also be deactivated.

Turning now to FIG. 1, there is shown a communication network 100, or at least a portion thereof, adapted to transmit large amounts of data between a data interface 110 and a data repository 150. For example, data repository 150 may maintain a large amount of data 154 that is accessible via repository interface 152 and data interface 110 may facilitate access to data 114 via a repository interface 112 and data 154 via repository interface 152. Communication devices 120 and 160 may provide high-speed data transmission between data interface 110 and data repository 150 to reduce differences in the latency of accesses between data 114 and data 154.

Communication network 100 comprises data interface 110 coupled with communication devices 120 and data repository 150 coupled with communication devices 160. Furthermore, communication devices 120 communicatively couple with communication devices 160 via communication media 140. Communication devices 120 and 160 may include servers, switches, routers, bridges, or any other device that can communicate via communication media 140. Although communication media 140 is illustrated as a wired connection, communication media 140 may also be implemented via wireless transceivers, fiber optic filaments, and/or other communication media. In some embodiments, communication devices 120 and 160 may also include components such as an Etherchannel driver, an Ethernet driver, and failure detection logic 130 and 170, respectively.

In the present embodiment, communication media 140 comprises cables with connectors, wherein the connectors plug into ports that are provided by bundled adapters 124 and 164. Each port can provide a physical connection between a cable of communication media 140 and a single adapter of bundled adapters 124 or 164. Bundled adapters 124 may comprise two or more adapter cards bundled to share data transmission responsibilities between communication devices 120 and 160. Bundled adapters 124 and 164 can be circuit cards that plug into card slots in the communication devices 120 and 164 and may include one or more backup cards in case one of the bundled adapters fails or is otherwise unreliable for transmission of data across communication media 140. Furthermore, bundled adapters 124 and 164 may implement the data link and physical layers (of the Open Systems Interconnection "OSI" layer model) of operation in the communication process to transfer data between communication devices 120 and communication devices 160.

Failure detection logic 130 may be hardware, code, or some combination thereof, adapted to detect failing or failed adapter cards of bundled adapters 124 and, in some embodiments, to activate a backup adapter card to replace the failed or failing adapter card. Failure detection logic 130 comprises a timing module 132, an activity monitor/comparator 134, and a traffic generator 136. Timing module 132 may comprise a clock or receive a clock signal to determine the expiration of a time period related to data transmission activity of one or more adapter cards of bundled adapters 124.

Activity monitor/comparator 134 may monitor data transmission activity related to the adapter card during the time period and compare the activity level to a predetermined activity level. If the activity level of the adapter card is less than the anticipated activity level for that adapter card or for adapter cards of bundled adapters 124 generally, activity monitor/comparator 134 may indicate that the activity level is suspect. In some embodiments, the indication may relate to a specific adapter card.

In other embodiments, activity monitor/comparator 134 may monitor and compare other aspects of data transmission by adapter cards such as the number of retransmission requests, the fraction of unsuccessful to successful data transmissions, and the like. In such embodiments, activity monitor/comparator 134 may compare the activity to predetermined values or may compare the activity against the activity of other adapter cards in bundled adapters 124. In further embodiments, activity comparisons may be weighted for each adapter card in relation to heuristic data about traffic across communication media 140 and/or the load-balancing scheme implemented for bundled adapters 124.

In response to an indication of a suspect activity level from activity monitor/comparator 134, traffic generator 136 may transmit a test packet via one or more of the adapters in bundled adapters 124. In several embodiments, traffic generator 136 may include source and/or destination MAC addresses 122 for one or more individual adapter cards of bundled adapters 124 to assure that particular adapter cards being tested are assigned duties to transmit and/or receive the test packet. For example, if activity monitor/comparator 134 indicates that activity of a particular adapter card is suspect, traffic generator 136 may transmit a packet with the source and/or destination address of the suspect adapter card. In other embodiments, failure detection logic 130 may transmit a number of packets in a manner to assure that each adapter card transmits and/or receives the packet at least once.

After traffic generator 136 transmits one or more test packets via adapter cards of bundled adapters 124, activity monitor/comparator 134 monitors the corresponding adapter cards for transmission and/or reception activity. If one or more of the adapter cards fail to indicate the transmission and/or reception activity related to the test packet, failure detection logic 130 may flag the one or more adapter cards as failed by storing one or more bits in a register.

Failure detection logic 170 interacts with bundled adapters 164 in a manner similar to that of failure detection logic 130 with bundled adapters 124. However, failure detection logic 170 comprises memory to store MAC addresses 178, whereas failure detection logic 130 accesses MAC addresses available via communication devices 120. In many embodiments, failure detection logic 130 may communicate with failure detection logic 170 to identify failed or failing adapters of bundled adapters 124 and 164. For example, when an adapter of bundled adapters 124 fails to receive a packet, the problem may reside with that adapter or the transmitting adapter of adapter bundle 164. Thus, failure detection logic 130 may communicate with failure detection logic 170 to determine whether an activity monitor of failure detection logic 170 indicates a successful transmission of the packet. If bundled adapters 164 successfully transmit the packet but bundled adapters 124 fail to receive the packet after a number of retransmissions, the failed adapter may be part of bundled adapters 124. On the other hand, if the adapter of bundled adapters 164 does not successfully transmit the packet after a number of retries, the failed adapter may be part of bundled adapters 164.

Figure 2:
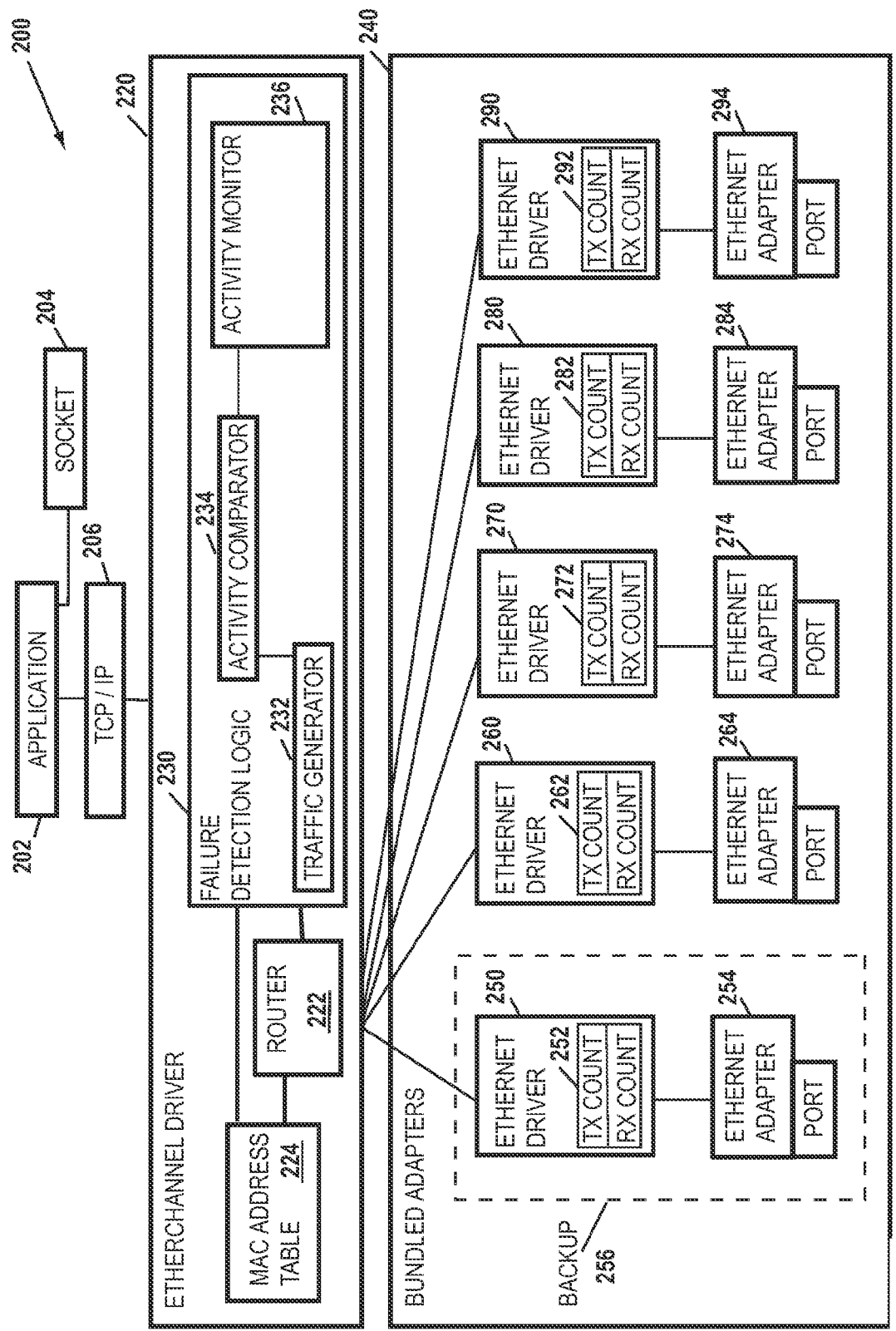
FIG. 2 illustrates a block diagram of a portion of a communication device having bundled Ethernet adapters and a failure detection logic.

Referring to FIG. 2, an Open Systems Interconnection (OSI) layer diagram 200 associated with bundled adapters 240 for an Ethernet network interface. This embodiment provides an example for one protocol of many possible protocols. Further embodiments implement other protocols. Generally, an application 202 represents a set of instructions such as an operating system, code to support an operating system, code to execute within a environment created by a operating system, and/or other code. Application 202 may determine to transmit information across an Ethernet network and can produce transmittable data representative of the information in compliance with a protocol defined via a socket 204.

Transmission Control Protocol/Internet Protocol (TCP/IP) 206 comprises a two-layer protocol to adapt the information for transmission across a TCP/IP network like the Ethernet network. Etherchannel driver 220 comprises a code to utilize Ethernet drivers 250-290 and Ethernet adapters 254-294 as bundled adapters 240. In particular, Etherchannel driver 220 divides the data transmission responsibilities between the adapters 254-294 of bundled adapters 240, whereas Ethernet drivers such as Ethernet driver 270 coordinate transmission across communication media via single adapters such as Ethernet adapter 274. In the present embodiment, Etherchannel driver 220 maintains Ethernet driver 250 and Ethernet adapter 254 as a backup 256 and can utilize backup 256 to replace a failing adapter and driver pair of bundled adapters 240.

Etherchannel driver 220 comprises a router 222, a media access control (MAC) address table 224, and a failure detection logic 230. Router 222 determines a route for data received via TCP/IP 206. Router 222 may place outgoing data in an outgoing queue. In some embodiments, the outgoing queue may be associated with a particular Ethernet driver of Ethernet drivers 250-290. In further embodiments, router 222 may associate packets of data with MAC addresses from MAC address table 224 to assign the packets of data with specific Ethernet drivers of Ethernet drivers 250-290. In still other embodiments, Ethernet drivers 250-290 may gather packets from an outgoing queue that is associated with bundled adapters 240, based upon availability of Ethernet adapters 254-294 to transmit the packets, priorities associated with the packets, and/or other factors.

Failure detection logic 230 may test and monitor operations of Ethernet drivers 250-290 and Ethernet adapters 254-294 to detect failed adapters. Failure detection logic 230 may be code of Etherchannel driver 220 and may comprise a traffic generator 232, an activity comparator 234, and an activity monitor 236. In some embodiments, traffic generator 232 may generate a packet and assign transmission and/or reception of the packet to Ethernet adapter 284 by associating the packet with one or more MAC addresses for Ethernet driver 280. Ethernet driver 280 may increment one or more values in a register, TX count/RX count 282, upon transmitting and/or receiving the packet. Activity monitor 235 may detect the TX count/RX count 282 and activity comparator 234 may compare the detected activity with projected activity to determine whether Ethernet driver 280 and Ethernet adapter 284 are operating properly. If Ethernet driver 280 and Ethernet adapter 284 are not operating properly, failure detection logic 230 may flag Ethernet driver 280 and Ethernet adapter 284 as a failed adapter and, in the present embodiment, utilize backup 256. In further embodiments, failure detection logic 230 may transmit a notification of the failed adapter via hardware, application 202, and/or other notification devices.

In other embodiments, failure detection logic 230 can have an internal timer and instruct the Ethernet drivers 250-290 to store the transmit activity and receive activity data in registers, TX count/RX count 252-292, during a predetermined time interval. After completion of the time interval, activity monitor 236 can retrieve the activity level data from TX count/RX count 252-292. Activity comparator 234 may compare the retrieved activity data to a threshold level of activity, to identify drivers and adapters that appear to exhibit abnormal behavior. The activity level could be a measure of how many packets are transmitted or received by an adapter each minute. If failure detection logic 230 determines that a component such as a driver or an adapter is operating in an acceptable manner, the timer and registers can be reset to zero and monitoring can continue. On the other hand, if failure detection logic 230 determines that a driver and/or adapter has a low activity level, or the activity level is less than a predetermined level, the driver and/or adapter can be identified as a suspect driver and/or adapter (a candidate for further testing).

Upon identification of a suspect driver and/or adapter, traffic generator 232 may generate a test packet and address the packet to the suspect adapter. Such a packet can also include an echo command or a ping command. In other embodiments, traffic generator 232 may request that application 202 or other mechanism generate the packet and then associate the packet with a MAC address of the suspect adapter.

After the packet is sent, activity monitor 236 can again retrieve stored activity data of TX count/RX count 252-292 to see if the packet facilitated any transmit or receive activity. In one embodiment, activity monitor 236 can monitor for a specific reply to the packet. The echo command may also request a self-test to be performed by the suspect driver or adapter. In further embodiments, multiple types of feedback can be gathered and analyzed by the failure detection logic 230 to determine if an adapter has failed.

Bundled adapters 240 may be a number of Ethernet drivers 250-290 paired with Ethernet adapters 254-294, respectively, adapted via code and/or hardware to function as a single communications channel. Each Ethernet driver and Ethernet adapter pair may be assigned an exclusive media access control (MAC) address. And, in the present embodiment, each Ethernet driver 250-290 may comprise logic to maintain TX count/RX count 252-292, respectively, to facilitate monitoring data transmission activity of each Ethernet driver and Ethernet adapter pair. Furthermore, each of the Ethernet adapters 254-294 may comprise a port to connect bundled adapters 240 to communication media. Ethernet adapters 254-294 could be implemented in the form of circuit cards that are insertable into, and removable from, a rack, a card cage, a processing device or a communication device.

In the present embodiment, each of Ethernet drivers 250-290 have a transmission activity monitor and counter and a receive activity monitor and counter to maintain TX count/RX count 252-292. TX count/RX count 252-292 stores values indicative of past activity of both the associated Ethernet drivers and the Ethernet adapters. For example, the TX count/RX count 252-292 can store the number of packets transmitted and received during a predetermined time interval. In other embodiments, the activity monitor/counter could even be embodied as a separate circuit card (not shown). Still further, the activity monitor/counter could be adapted to detect signal transitions on signal lines, and correspondingly store such data. In other embodiments, the registers, TX count/RX count 252-292, may be remotely located.

Figure 3:
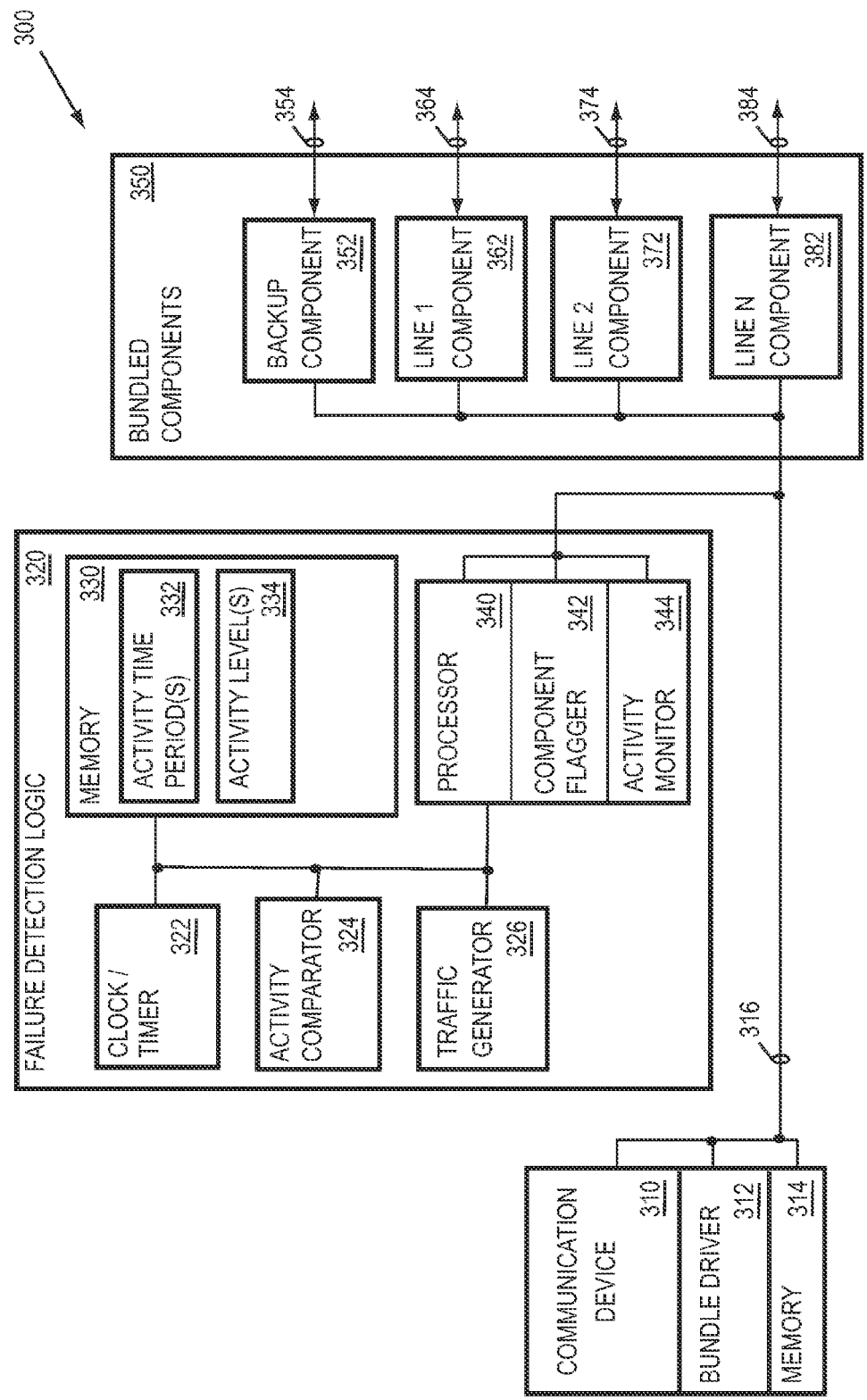
FIG. 3 depicts a block diagram of failure detection logic for bundled components.

Referring to FIG. 3, another embodiment of a communication network interface 300 is depicted. Communication network interface 300 includes a communication device 310 with a bundle driver 312 and memory 314 coupled with bundle components 350 and a failure detection logic 320. Communication device 310 sends and receives data via bundled components 350 communication media 354-384. And bundle driver 312 distributes data transmission load for outgoing data amongst components 352-382 of bundled components 350.

Failure detection logic 320 can include a processor 340 with a component flagger 342 and an activity monitor 344. Failure detection logic 320 can also include memory 330, a clock/timer 322, an activity comparator 324, and a traffic generator 326. Processor 340 coordinates testing and usage of test functions and data. For instance, processor 340 may initiate testing based upon predetermined and/or dynamic factors such as the passage of clock cycles, previous activity levels, a pattern of activity, and/or other factors.

During operation, clock/timer 322 can be configured to define specific time periods during which the monitoring process can be conducted. Such timing parameters could be utilized to activate and deactivate many components or processes, and the timing configurations for such activation can be user selectable. For example, activity of components 362-382 can be monitored for a time period of specific duration at reoccurring, predetermined intervals. In the present embodiment, a user may select or modify the timing of each of these, time dependent features. Such user selections can be stored in activity time periods 332 of memory 330.

Processor 340 may request data transmission activity from activity monitor 344 responsive to clock/timer 322 and pass the data transmission activity to activity comparator 324. Activity comparator 324 can compare the activity against activity level(s) 334 stored in memory 330 for components 352-382 when the activity level determined by activity monitor 344 is less than predetermined activity level of activity level(s) 334, the processor 340 can identify a suspect component based on the results. The processor 340 can then activate traffic generator 326 to generate and transmit a test packet with the MAC address of the suspect component. The test packet can include instructions that request a response from the suspect component. Activity monitor 344 can monitor the system for any activity subsequent to the sending of the test packet and component flagger 342 can flag the suspect component if an appropriate response is not detected by activity monitor 344.

In some embodiments, activity level(s) 334 may be preliminary test metrics that can be updated based upon heuristic data related to activity levels of specific components or average activity levels for components within bundled components 350. In other embodiments, the levels may comprise median or average levels of activity anticipated, ranges of levels anticipated, and/or other level indications.

Traffic generator 326 can generate a test packet that has a ping command, an echo command, a self test command or a command that instructs a component to reply with specific data such as a request for the contents stored at a specific memory location. Activity monitor 344 could also acquire the results of component activity with assistance from other components or sources. Thus, traffic generator 326 can generate packets and send packets to the suspect or candidate component and if the component is not operating properly, the communication network interface 300 will not receive an appropriate reply, and a component can be flagged as a failed component.

When it is determined that a component has failed, failure detection logic 320 may activate backup component 352 and deactivate the failed component by utilizing the MAC address of the backup component 352 in place of the MAC address of the failed component. The time intervals and time periods mentioned above can be adjusted (i.e. lengthened or shortened) to improve the performance of failure detection logic 320.

Bundled components 350 comprises components 362, 372, and 382 (362-382) and a backup component 352. Bundled components 350 may comprise devices such as Ethernet adapter cards and can facilitate network communications between remote devices (not shown) and the communication device 310. Line N component 382 represents any number of components that can be bundled with components 362 and 372.

Figure 4:
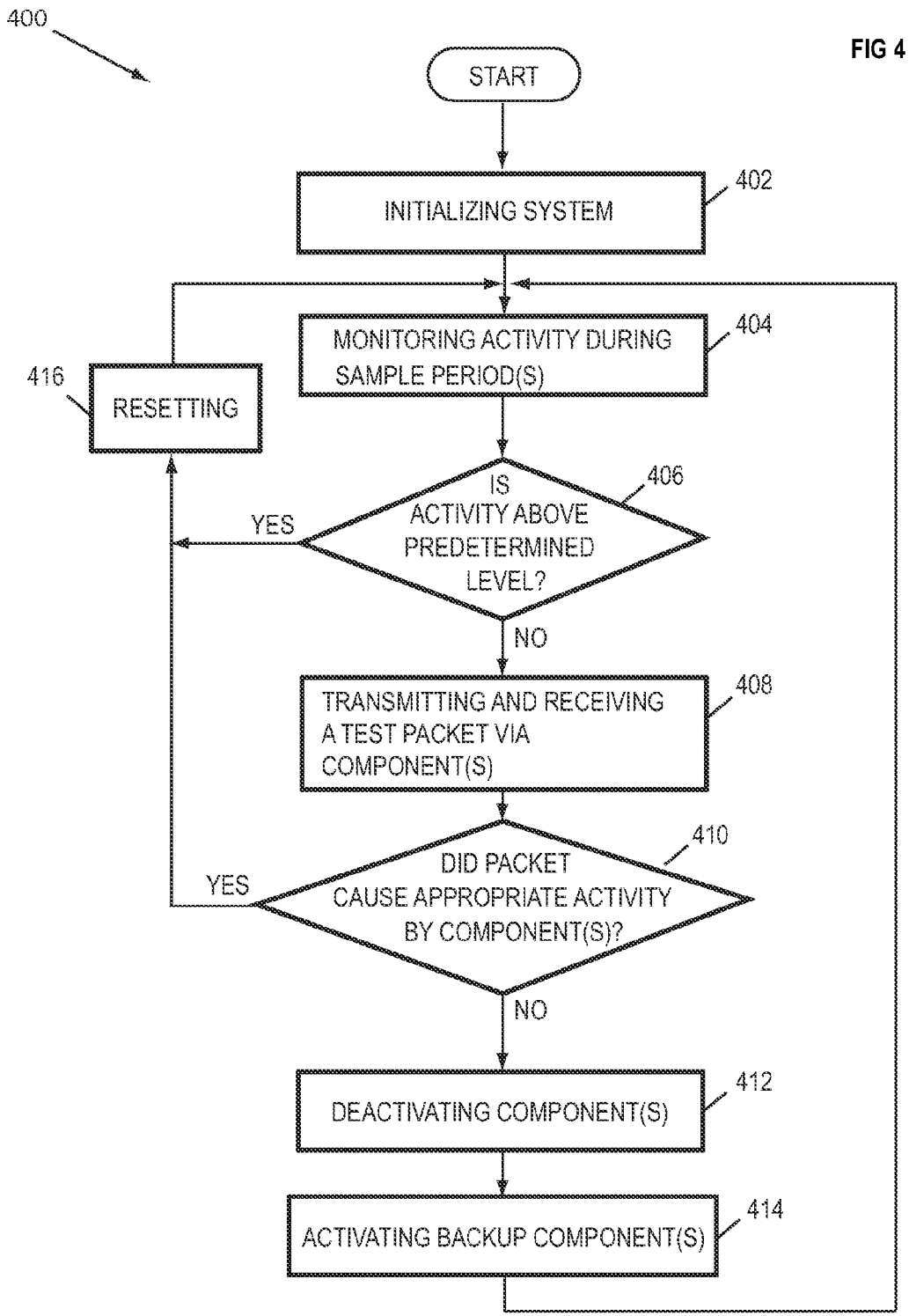
FIG. 4 illustrates a method for detecting a failure of a component in a bundled configuration.

Referring to FIG. 4, a flow diagram 400 depicting operation of an embodiment of failure detection logic for bundled communication components of a communication network interface is disclosed. As illustrated in block 402 the failure detection logic may be initialized. During initialization, the failure detection logic may store a time interval for acquiring a sample activity level for a communication component and a minimum activity threshold level, and may reset an activity count and a timer. Additionally, the failure detection logic may store a duty cycle or time intervals for the reoccurring test intervals provided by the user. The stored parameters may dictate the timing of transactions that sample the activity of communication components. In one embodiment, an Ethernet adapter is the communication component of interest. The minimum activity level may comprise a ratio of successful transmission acknowledgements to requests for retries, a number of packets successfully transmitted, a number of packets successfully received, and/or other factors indicative of the operation of a communications component.

In block 404, the failure detection logic may monitor activity of the communication component during sample periods set during initialization at block 402. At decision block 406, an activity comparator may compare activity levels of the communication component against the predetermined activity levels to determine whether the activity level of the communication component is above the predetermined level. If the activity level of the communication component is above the predetermined level, the failure detection logic can proceed to block 416 to reset the timer and counter and, proceed to block 404 to continue to monitor the activity of the same or another communication component.

When the activity level of the communication component is below the predetermined level, as determine at block 406, the failure detection logic may address one or more test packets to transmit and receive the one or more test packets via the communication component as described in block 408. At decision block 410, the failure detection logic can determine whether the communication component shows any activity in response to the one or more test packets. If more than a threshold activity is detected, then the failure detection logic can proceed to block 416 where the timer and counter are reset and the monitoring activity can continue. When a less than a threshold activity level is detected, the failure detection logic may deactivate the communication component and/or remove the communication component from an assignment availability table at block 412. The assignment availability table may comprise MAC addresses available for assigning outgoing packets for transmission across communication media and/or available for receiving packets via the communication media.

At block 414, the failure detection logic may activate a backup component such as a backup Ethernet adapter to replace a failed communication component. In one configuration, the failure detection logic may send a message in electronic mail (email) format to a user or an administrator of the network in an effort to notify the administrator of the failure. Such a failure detection system can detect hardware and software failures associated with bundled components.

In another embodiment, the steps illustrated in blocks 404 and 406 can be skipped, wherein after initialization at block 402, the process can send test communications at predetermined time intervals, possibly every ten minutes and listen for a reply. The test communication can also be activated based on detecting an idle communication component as illustrated in block 410.

Figure 5:
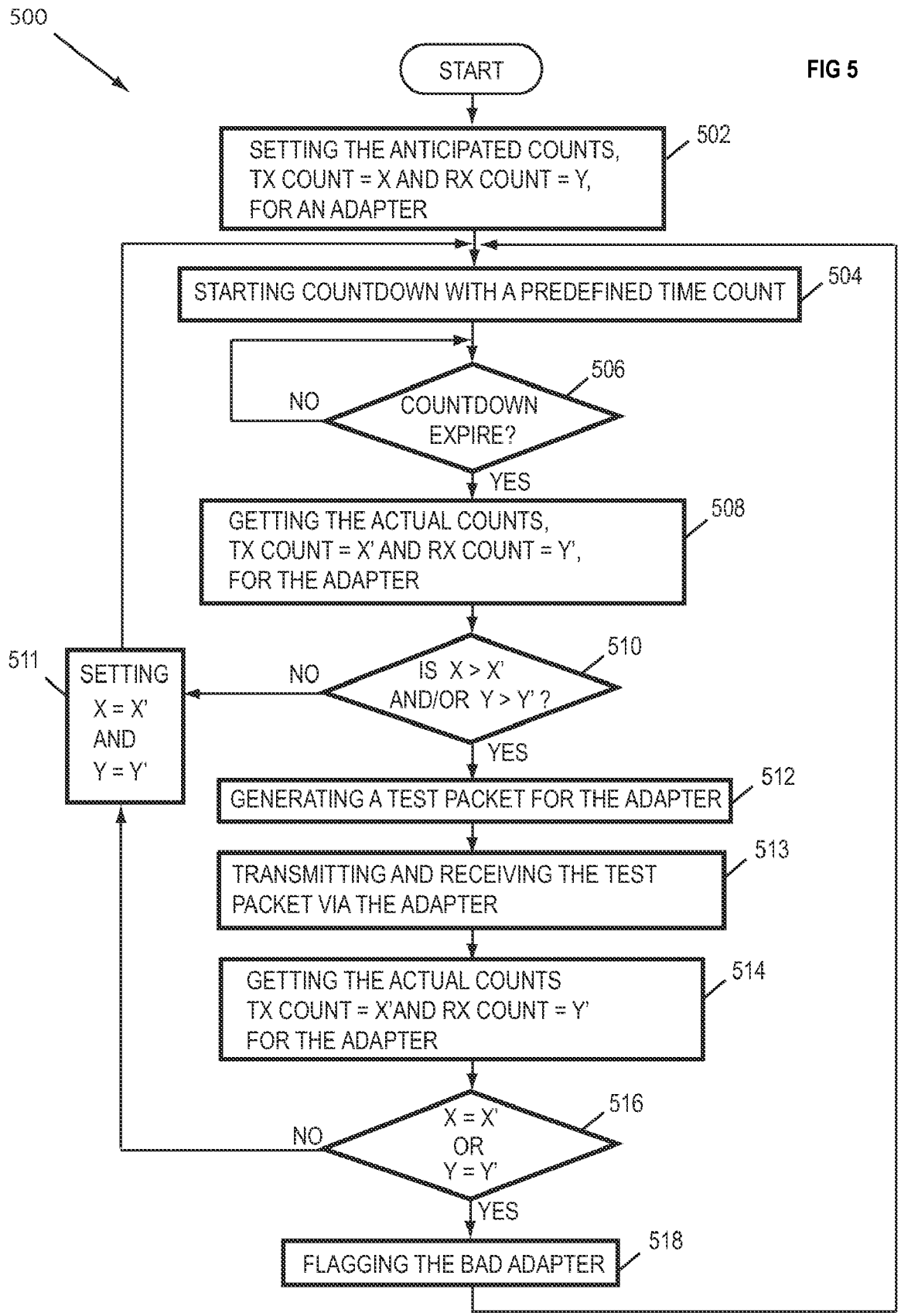
FIG. 5 depicts a method for detecting a failed adapter in a bundle of adapters.

Referring to FIG. 5, a flow diagram 500 for a failure detection logic to detect failures of individual adapters of bundled adapters is depicted. As illustrated in block 502, the failure detection logic may set a transmit counter (TX COUNT) and receive counter (RX COUNT) to a predetermined or threshold value (X and Y, respectively), such as zero, indicating a minimum activity level that an adapter should have even during periods of low activity. In accordance with block 504, the failure detection logic may determine when and how long activity of an adapter is to be monitored based upon a timer.

The timer can have a predetermined expiration value and create an alarm when the time period expires. When the time period expires, the failure detection logic may retrieve the monitored transmit count (X') and receive count (Y') for the adapter as illustrated in block 508. At decision block 510, the failure detection logic may determine if the monitored transmit and receive counts (X' and Y') are less than the anticipated transmit and receive counts (X and Y) set in block 502. When the threshold counts are less than or equal to the monitored counts, the transmit counter TX COUNT) can be set to the monitored transmission count (X') and the receive counter (RX COUNT) can be set to the monitored receive count (Y') as illustrated in block 511. The failure detection logic may then proceed back to block 504 where the timer can be restarted.

When the monitored counts (X' and Y') are less than the threshold counts (X and Y), a traffic generator may generate a test packet for the adapter, as illustrated in block 512. The failure detection logic may route the test packet to transmit and/or receive the test packet via the adapter in accordance with block 513. The activity monitor may gather the monitored transmit and receive counts (X' and Y') at block 514. Then, the activity comparator may again compare the anticipated transmit and receive counts (X and Y) against the monitored transmit and receive counts (X' and Y') to determine whether the monitored counts changed in response to the test packet, as illustrated at decision block 516. When the monitored counts change in response to the test packet, the threshold counts can be reset (X=X' and Y=Y') at block 512. If the monitored counts have not changed, the failure detection system can identify the adapter as a failed or bad adapter as described by block 518. The failure detection logic may then return to block 504 to continue monitoring the remainder of the bundled adapters.

Figure 6:
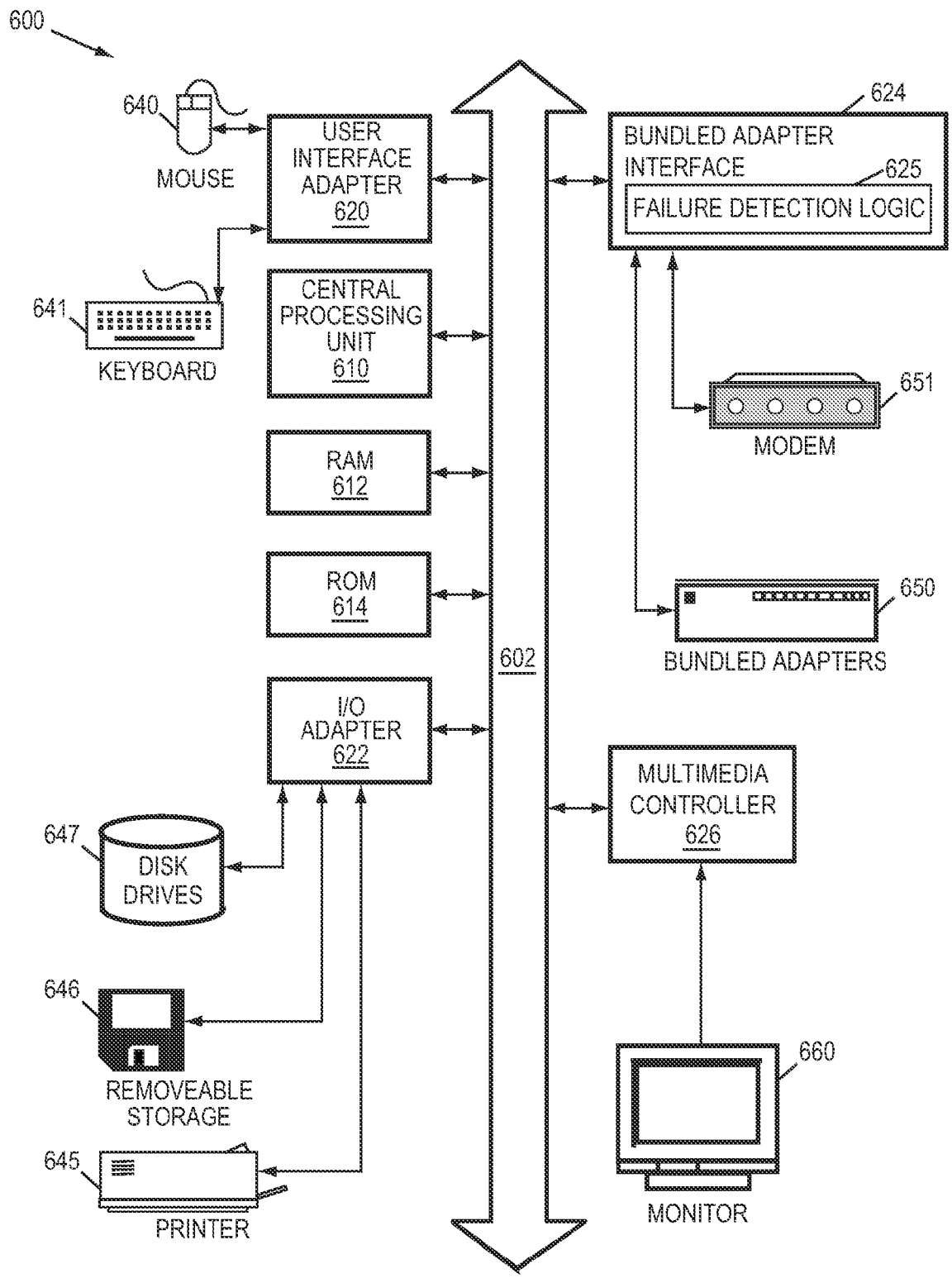
FIG. 6 illustrates a computer system with bundled adapters that could be utilized to implement the methods described herein.

FIG. 6 illustrates, in a block diagram format, a processing device such as a personal computer system 600. The computer system 600 is illustrated to include a central processing unit 610, which may be a conventional proprietary data processor, memory including random access memory (RAM) 612, read only memory (ROM) 614, and input-output (I/O) adapter 622, a user interface adapter 620, a bundled adapter interface 624, and a multimedia controller 626.

The input output (I/O) adapter 622 is further connected to, and controls, disk drives 647, printer 645, removable storage devices 646, as well as other standard and proprietary I/O devices. The user interface adapter 620 can be considered to be a specialized I/O adapter. The adapter 620 as illustrated is connected to a mouse 640, and a keyboard 641. In addition, the user interface adapter 620 may be connected to other devices capable of providing various types of user control, such as touch screen devices (not shown).

Bundled adapter interface 624 facilitates high bandwidth data transmission via bundled adapters 650 and also couples with a modem 651. Bundled adapter interface 624 comprises a failure detection logic 625 to monitor the proper operation of individual adapters of bundled adapters 650. For instance, failure detection logic 625 may compare a monitored fraction of retries to successful transmissions against a predetermined fraction. If the monitored fraction is significantly greater from the predetermined fraction for a particular adapter, failure detection logic 625 may further test that adapter by generating test packets for the particular adapter to transmit and receive. If the particular adapter transmits and receives the test packets within a predetermined number of retries, the adapter may be marked as suspect and the failure detection logic 625 may continue to monitor bundled adapters 650. On the other hand, if the particular adapter does not transmit and receive the test packets within the predetermined number of retries, the adapter may be marked as failed and the failure detection logic 625 may continue to monitor the remainder of bundled adapters 650.

The multimedia controller 626 will generally include a video graphics controller capable of displaying images upon the monitor 660, as well as providing audio to external components (not illustrated). Additionally, a system such as system 600 could be utilized to execute the methods described within this disclosure.

Another embodiment of the invention is implemented as a program product for implementing a failure detection logic such as systems and methods described with reference to FIGS. 1-6. The invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet adapter cards are just a few of the currently available types of network adapters.

The failure detection logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates methods and arrangements to detect failure in a communication system. It is understood that the form of the embodiments shown and described in the detailed description and the drawings are to be taken merely as examples. It is intended that the following claims be interpreted broadly to embrace all the variations of the example embodiments disclosed.

Although the present disclosure and some of its advantages have been described in detail for some embodiments, it should be understood that various changes, substitutions and alterations can be made herein without departing from the spirit and scope of the disclosure as defined by the appended claims. Although specific embodiments of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to detect a failure of a communication component of a bundle of network adapters, the method comprising:
routing data to a network adapter that shares at least one Internet protocol address with other network adapters of the bundle, the routing of the data to activate the network adapter, wherein the network adapters of the bundle are configured to receive data in parallel, wherein further the network adapters of the bundle comprise network adapters of a communication device;
monitoring the activated network adapter to determine a monitored activity level responsive to reception of the routed data;
comparing, via the communication device, the monitored activity level to a predetermined activity level; and
flagging the network adapter as a failed component in response to the monitored activity level being less than the predetermined activity level.

2. The method of claim 1, further comprising determining an elapsed time subsequent to the routing of an echo command, wherein the data comprises the echo command and flagging comprises flagging the network adapter as the failed component if a reply to the echo command is not received during the elapsed time.

3. The method of claim 1, further comprising deactivating the failed component.

4. The method of claim 1, further comprising activating a backup component to replace the failed component.

5. The method of claim 1, further comprising transmitting a notification of the failed component.

6. The method of claim 1, wherein routing comprises routing the communication if the monitored activity level of the network adapter is below the predetermined activity level during a predefined time period.

7. The method of claim 1, wherein routing comprises routing a packet having a media access control address associated with the network adapter.

8. The method of claim 1, wherein routing comprises routing a packet with a media access control address indicating a destination associated with the network adapter.

9. The method of claim 1, wherein routing comprises routing the data at predetermined time intervals.

10. The method of claim 1, wherein routing comprises routing the communication when the network adapter is idle, wherein further the communication device comprises a plurality of routers.

11. The method of claim 1, wherein monitoring comprises detecting at least one of a transmit activity and a receive activity.

12. An apparatus to detect failure of a network adapter of bundled adapters, the apparatus comprising:
a timing module to define a time interval;
an activity monitor to determine a communication activity level of a network adapter during the time interval and to monitor activity of the network adapter responsive to at least one test packet, wherein the bundled adapters operate in parallel via a load-sharing arrangement of a driver;
an activity comparator to compare the determined communication activity level to a predetermined activity level, to identify the network adapter as a suspect adapter if the determined activity is less than the predetermined activity level;
a traffic generator to transmit at least one test packet to the suspect adapter, the activity monitor to monitor activity in response to the transmission of the at least one test packet; and
a flagger to flag the suspect adapter as a failed adapter if the monitored activity is less than a projected activity associated with the at least one test packet.

13. The apparatus of claim 12, further comprising a processor to modify an address assignment table based upon a failure of the network adapter.

14. The apparatus of claim 12, wherein the network adapter comprises logic to count packet receptions.

15. The apparatus of claim 12, wherein the activity monitor detects activity of the network adapter subsequent to the transmission of the at least one test packet and flags the network adapter as a failed adapter if no activity of the network adapter occurs, responsive to the at least one test packet.

16. A system comprising:
bundled network adapters to share a data transmission load, wherein the bundled network adapters are configured to operate in parallel;
a failure detection logic coupled to the bundled network adapters to retrieve a first value indicative of data transmission activity, to identify a suspect network adapter based upon the value, to transmit a test packet via the suspect network adapter, to retrieve a second value indicative of data transmission activity via the suspect network adapter, and to determine whether to mark the suspect network adapter as a failed network adapter based upon the second value.

17. The system of claim 16, wherein the failure detection logic further comprises a flagger to deactivate the failed network adapter.

18. The system of claim 16, wherein the flagger is adapted to activate a backup network adapter to replace the failed network adapter.

19. The system of claim 16, wherein the failure detection logic is capable of communicating with another failure detection logic to identify the failed network adapter.

20. An apparatus configured to detect failures, the apparatus comprising:
a traffic generator adapted to generate at least one packet to initiate a data transmission routed via a communication component of a bundle of components, wherein the bundle of components is configured to share data transmission activity related to at least one network address;
an activity monitor to detect a monitored activity level of the communication component responsive to the at least one packet; and
an activity comparator to compare the monitored activity level against a predetermined activity level to determine whether to identify the communication component as a failed component.

21. The apparatus of claim 20, further comprising a component flagger to flag the communication component as a failed component if the activity monitor detects less than a predetermined activity level.

22. The apparatus of claim 20, further comprising a register to store the monitored activity level.

23. The apparatus of claim 20, further comprising a processor to control at least one timer, the traffic generator, the activity monitor, and the activity comparator.

24. The apparatus of claim 20, wherein the at least one packet comprise a test packet having a destination media access control address of the communication component.

25. The apparatus of claim 20, wherein the communication component is an Ethernet adapter.

26. The apparatus of claim 20, further comprising a backup component.

27. The apparatus of claim 20, wherein the activity comprises transmit and receive activity.

28. A computer program product comprising a computer useable medium storing a computer readable program, wherein the computer readable program when executed on a computer causes the computer to:
route data to a communication component that shares at least one Internet protocol address with other communication components of the bundle, wherein routing the data should activate at least a portion of the communication component;
monitor at least the portion of the communication component to determine a monitored activity level responsive to the communication; compare the monitored activity level to a predetermined activity level; and
identify the communication component as a failed component if the monitored activity level is less than a predetermined activity level.

29. The computer program product of claim 28, wherein the computer readable program when executed on a computer further causes the computer to activate a backup component to replace the failed component.

* * * * *